United States Patent [19]

Nishimura et al.

[11] 4,343,023
[45] Aug. 3, 1982

[54] MAGNETIC RECORDING AND REPRODUCTION OF DIGITAL INFORMATION

[75] Inventors: Kazutoshi Nishimura, Tokorozawa; Tadashi Hirono, Sayama, both of Japan

[73] Assignee: Nippon Telegraph & Telephone Public Corp., Tokyo, Japan

[21] Appl. No.: 199,623

[22] Filed: Oct. 22, 1980

[30] Foreign Application Priority Data

Oct. 27, 1979 [JP] Japan .................. 54-139036

[51] Int. Cl.³ .............................. G11B 5/09
[52] U.S. Cl. ........................ 360/40; 360/45
[58] Field of Search ............ 360/39, 40, 41, 45

[56] References Cited

U.S. PATENT DOCUMENTS 3,648,265 3/1972 Kobayashi et al. ............ 360/41
3,810,111 5/1974 Patel .............................. 360/40
3,921,210 11/1975 Halpern ......................... 360/40
4,027,335 5/1977 Miller ............................ 360/45

Primary Examiner—Vincent P. Canney
Attorney, Agent, or Firm—Blakely, Sokoloff, Taylor & Zafman

[57] ABSTRACT m bit data words are converted into one or two n bit (n>m) record words wherein the absolute value of a recording current is less than a predetermined value so as to eliminate a DC component from the recording current. Reproduction is made according to a partial response method thus enabling high linear bit density.

13 Claims, 8 Drawing Figures

FIG. 1

| DATA WORD | CONVERSION CONDITION | RECORDED WORD | NRZI RECORDING CURRENT | RECORDED WORD CHARGE | AMPLITUDE DETECTION BIT | INVERSION DETECTION BIT | DATA WORD |
|---|---|---|---|---|---|---|---|
| 000 | NONE | 1111 | | 0 | X000 | X000 | 000 |
| 001 | P=0 AND C=1 OR P=1 AND C=0 | 1110 | | −2 | X001 | X000 | 001 |
| 001 | OTHER THAN DESCRIBED ABOVE | 0001 | | +2 | X001 | X000 | 001 |
| 010 | NONE | 1101 | | 0 | X011 | X001 | 010 |
| 011 | NONE | 0010 | | 0 | X011 | X000 | 011 |
| 100 | NONE | 0111 | | 0 | X100 | XX00 | 100 |
| 101 | P=0 AND C=1 OR P=1 AND C=0 | 1001 | | −2 | X101 | XX00 | 101 |
| 101 | OTHER THAN DESCRIBED ABOVE | 0110 | | +2 | X101 | XX00 | 101 |
| 110 | NONE | 0101 | | 0 | X111 | XX01 | 110 |
| 111 | NONE | 1010 | | 0 | X111 | XX10 | 111 |

FIG.2
(a) DATA WORD     0   1   0
(b) RECORDED WORD     1   1   0   1
(c) NRZI RECORDING CURRENT 
(d) MAGNETIC POLARITY INVERSION SEQUENCE    N|N   S|S     N|N
(e) REPRODUCED PULSE
(f) EQUALIZED REPRODUCED PULSE 
(g) EQUALIZED REPRODUCED SIGNAL 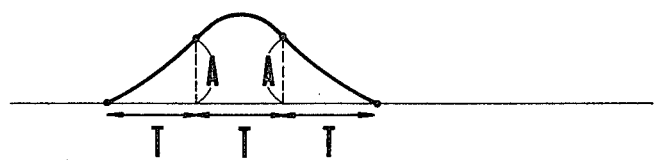
(h) AMPLITUDE DETECTION BIT     1   0   1   1
(i) INVERSION DETECTION BIT     0   0   0   1
(j) DATA WORD     0   1   0

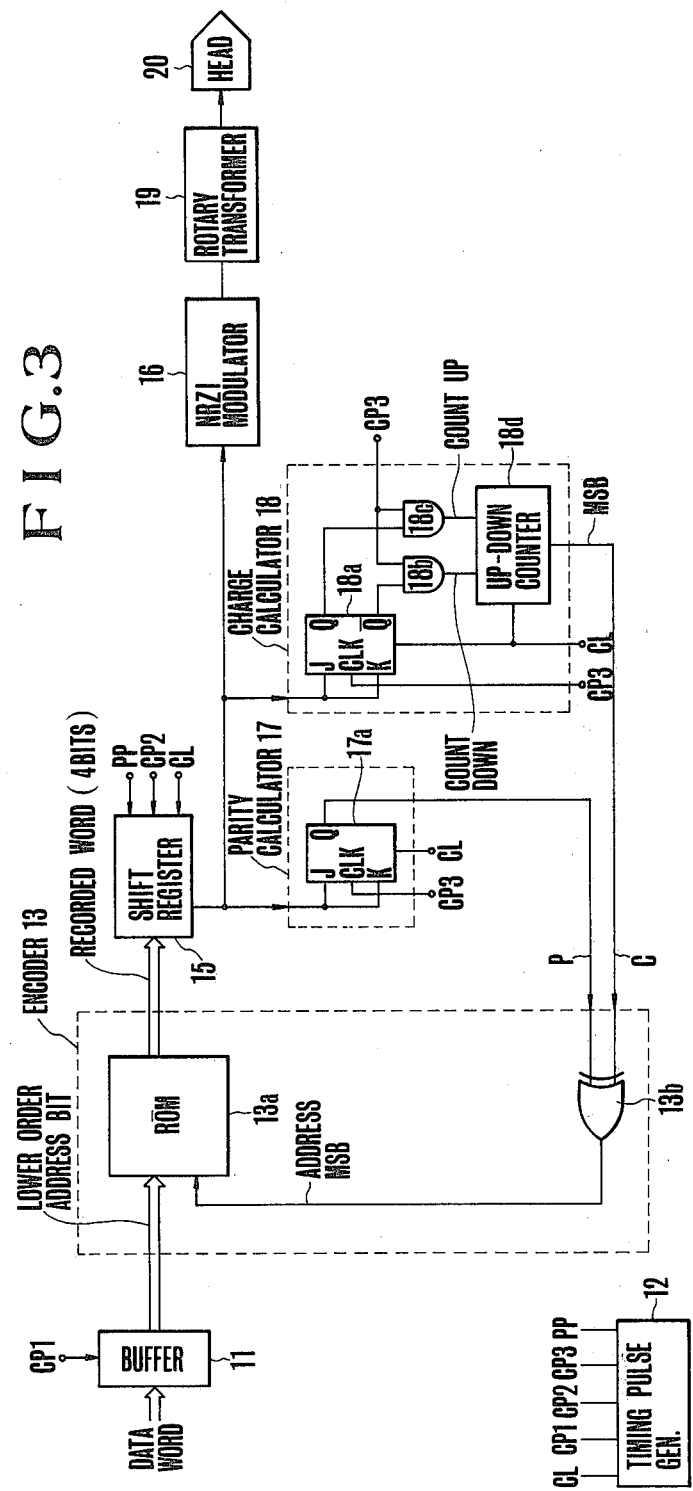
F I G. 3

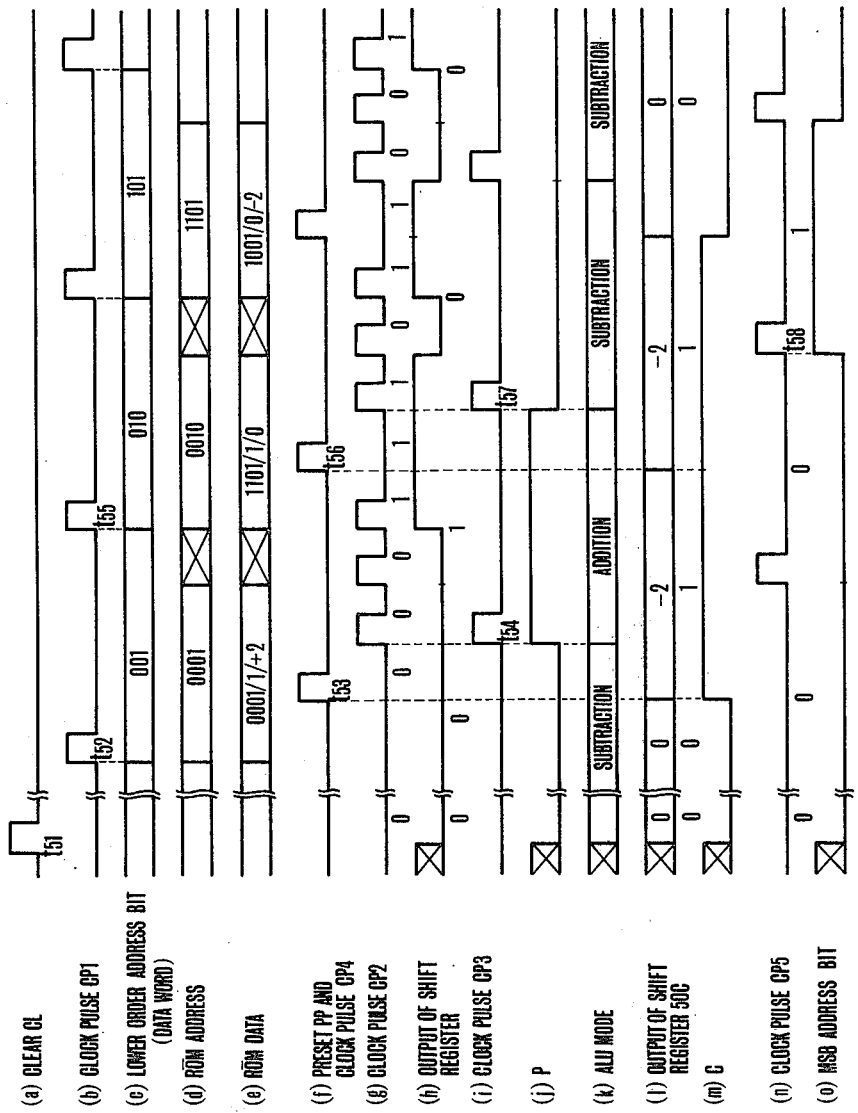

MAGNETIC RECORDING AND REPRODUCTION OF DIGITAL INFORMATION

BACKGROUND OF THE INVENTION

This invention relates to a method and apparatus for magnetically recording and reproducing digital informations, more particularly a method and apparatus for magnetically recording and reproducing digital informations with AC coupled magnetic heads.

A typical example of such apparatus utilizes a rotary head for recording informations on a magnetic tape and for reproducing the recorded informations. This rotary head type recording apparatus is advantageous in that as it is possible to increase the relative speed between the head and the tape, the reproduced signal can be made large and that when combined with servo technique it is possible to have a high track density recording. The recording current of this type of recording apparatus should not contain any DC component because the apparatus is provided with an AC coupling means in the form of a rotary transformer between a write driver and a write head. If a recording current containing a DC component were supplied to the apparatus, the current passed through the rotary transformer would be distorted thus not only causing erroneous writing but also erroneous read out.

SUMMARY OF THE INVENTION

Accordingly, it is the principal object of this invention to provide a method and apparatus for magnetically recording and reproducing digital informations by using an AC coupled magnetic head at high linear density.

Another object of this invention is to provide a method and apparatus for recording and reproducing digital informations which is free from an error propagation at the time of reproduction.

In short according to this invention, these and other objects can be accomplished by converting a m bit data word into a record word which is one of two record words corresponding to the data words and having n bits (n>m), so that the absolute value of the recording current of the converted record word may be less than a predetermined value, thereby eliminating the DC component in the recording current and enabling a high recording density by using a partial response system.

According to one aspect there is provided a method of magnetically recording and reproducing digital informations characterized by comprising the steps of preparing a conversion table in which data words each comprising a plurality of (m) bits correspond to respective record words each having n bits (n>m) and in which an integrated value of NRZI recording current becomes zero or correspond to two record words each including n bits and in which the integrated value of the NRZI recording current is not zero and polarities of the two record words are opposite, partitioning an original information bit sequence into data words at every m bits, converting the data words into record words when the former correspond to record words in the conversion table, when one of the data words corresponds to two second words in the conversion table, converting one of the record words into a record word such that, in accordance with the integrated value of the NRZI recording current up to a conversion point, an absolute value of the integrated value would decrease, recording a record word sequence obtained by the conversion on a magnetic medium as a magnetic polarity inversion sequence $$a_0, a_1, a_2 \ldots a_i \ldots$$

where $a_i$ represents by 1 or $-1$ a magnetic polarity inversion in which two N poles oppose each other or two S poles oppose each other and by O a magnetic polarity non inversion, and i represents a position in the magnetic polarity inversion sequence, reading the magnetic polarity inversion sequence out of the magnetic medium, converting read out informations into a 3 valued detected digit sequence of class 1 partial response type expressed by $$b_0, b_1, b_2 \ldots b_j \ldots$$

where $b_j = a_{j-1} + a_j$, and converting the detected digit sequence into an bit data words at every n digits and reproducing the m bit data words.

According to another aspect of this invention, there is provided apparatus for recording and reproducing digital informations, characterized by comprising an encoder provided with a conversion table according to which m bit data words are converted into n bits (n>m) record words by the data words acting as address inputs, an n bit shift register which m parallel stores, at a first timing, the n bit record words outputted from the encoder, an NRZI recording current modulator for producing a NRZI recording current in accordance with serially read out record words from the shift register at a second timing, a head connected to receive outputs of the NRZI recording current modulator for recording digit informations on a recording medium, means for detecting whether an integrated value of the NRZI recording current is zero or not, and for generating a control signal which selects a record word to be converted by the encorder according to a data word supplied at the next time according to an output of the detecting means and the integrated value of the NRZI recording current up to a conversion point, the conversion table of the encoder including a first portion in which respective data words are converted into one record word wherein the integrated value of the NRZI recording current becomes zero, and a second portion in which respective data words are converted into two record words wherein the integrated value of the NRZI recording current is not zero and the record words have different polarities, and the control signal generating means sending to the encoder a control signal which selects a record word having a sign which makes small the integrated value of the NRZI recording current up to a conversion point when the detecting means determines that the integrated value of the NRZI recording current does not become zero.

BRIEF DESCRIPTION OF THE DRAWINGS

In the accompanying drawings

FIG. 1 shows the content of a conversion table showing an encoding rule and useful to explain embodiments of the method and apparatus for magnetically recording and reproducing digital information according to this invention;

FIGS. 2a through 2j are waveforms of the recording and reproducing signals and are useful to explain the operation of the apparatus embodying the invention;

FIG. 3 is a block diagram showing a preferred embodiment of a recording apparatus embodying the invention;

FIGS. 8a through 8o show waveforms of various portions and are useful to explain the operation of the modified recording apparatus shown in FIG. 7.

DESCRIPTION OF THE PREFERRED EMBODIMENTS

Figure 4:
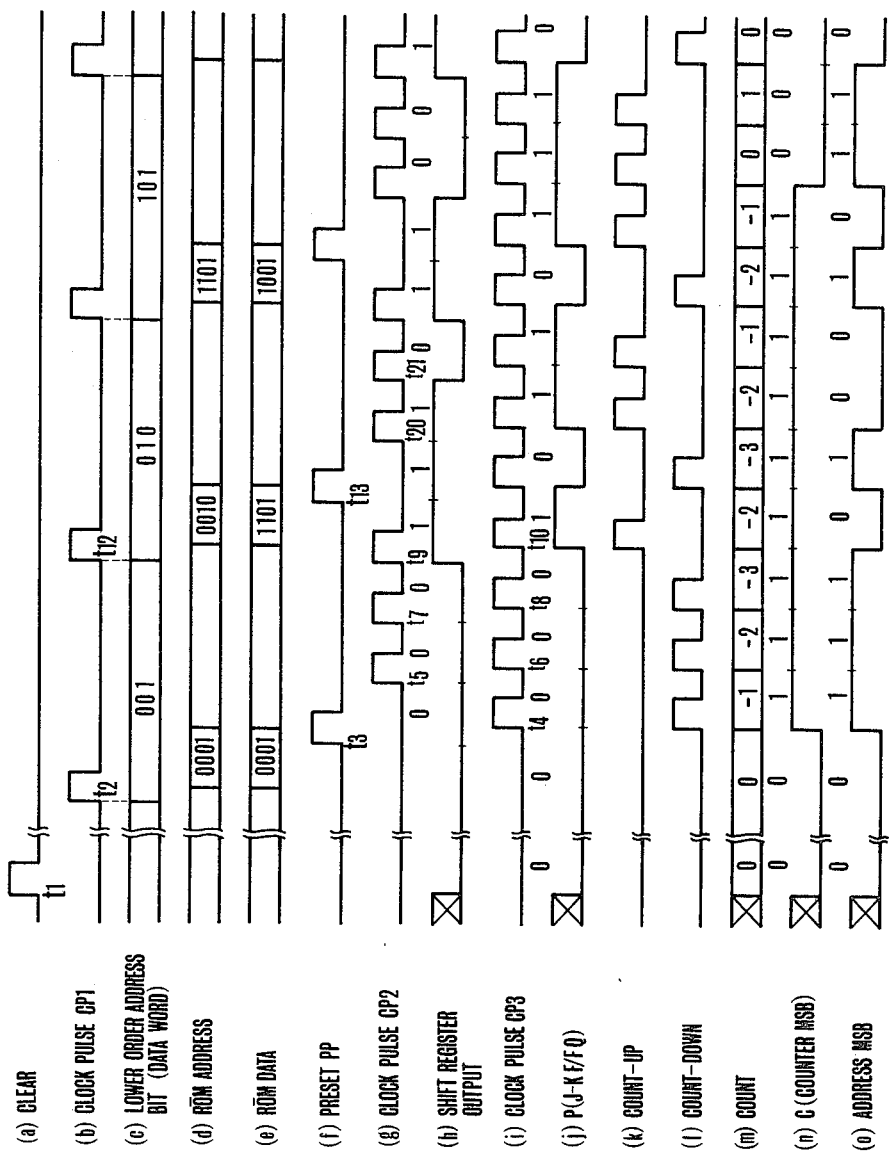
FIGS. 4a through 4o show waveforms at various portions and are useful to explain the operation of the apparatus shown in FIG. 3.

Before describing preferred embodiments of this invention reference is made to FIG. 1 showing a conversion table for explaining rules of encoding and decoding utilized in this invention. FIG. 1 shows correspondences among data words, conversion conditions, record words, NRZI recording currents, amplitude detection bits, inversion detection bits and reproduced data words. The data word to be recorded comprises 3 bits (m=3) for preparing 8 digital informations of from "000" to "111," and the record word to be recorded comprises 4 bits for preparing 10 digital informations. Accordingly, each data words corresponds to one or two record words. The integrated values (hereinafter called "record word charges") of the NRZI recording currents of respective record words corresponding to the data words at a 1:1 ratio, that is "1111", "1101", "0010", "0111", "0101" and "1010" are respectively zero.

Those wherein one data word corresponds to two record words are record words "1110" and "0001" corresponding to the data word "001" and the data words "1001" and "0110" corresponding to the record word "101". The record word charge of one of these paired record words is +2 whereas that of the other record word is −2. The absolute value of the NRZI recording current per one bit cell is calculated to "1" and bit "1" is represented by inverting the current at the fore edge of a bit cell. The NRZI recording current shows a case wherein a recording current immediately preceding the record word is positive (shown by a dot), and the record word charge shows a value of this case. For this reason, where the immediately preceding recording current is negative the polarity of the NRZI recording current would be inversed. However, even in such a case, the absolute values of the paired record word charges are equal and still maintain a relation of opposite polarities.

Where an original information bit sequence comprising only one data word corresponding to one record word, the integrated values of the record currents become zero at the ends of respective record words. Where a date word corresponding to two record words appears in the original information bit sequence, the integrated value of the recording current during an interval of from the fore end of a leading record word to the aft end thereof becomes +2 or −2. When a data word corresponding to two succeeding record words is converted into a record word whose record word charge becomes opposite sign, i.e. −2 (or +2) the integrated value of a recording current during an interval of from the fore end of a leading record word to the aft end of the record word produced by converting the data word returns again to zero. The conversion conditions shown in FIG. 1 follow the rule which returns the integrated value of the recording current to zero.

A symbol P represents the polarity of a recording current immediately before the record word, and if P were positive it is expressed as "0" whereas it negative as "1". Reference letter C represents "1" when the integrated value of the recording current during an interval of from the fore end of the leading record word to the aft end of a record word immediately preceeding a record word to be converted is larger than zero, whereas "0" when the integrated value is negative. FIGS. 2a through 2j show recording and reproducing signals when the data word is "010". The data word "010" shown in FIG. 2a is converted into a record word "1101" shown in FIG. 2b according to the conversion table shown in FIG. 1. This recording current is encoded by NRZI into a NRZI recording current shown in FIG. 2c. More particularly, the polarity of the recording current is inverted by bit "1" of the record word. When the recording current flows through the write head, the information is recorded on a recording medium as a magnetic polarity inversion sequence as shown. A signal produced by reading a magnetic polarity inversion with a read head is shown in FIG. 2e as a reproduced pulse. This pulse is equalized into a class I partial response signal utilized in the field of data transmission. This equalized signal is shown in FIG. 2f as an equalized reproduced pulse. The amplitude values obtained by sampling the equalized reproduced pulse with a bit spacing T of a record word have a constant value A before and after the peak of the equalized reproduced pulse, and zero at points other than the peak. The equalized reproduced signal obtained by reading the magnetic polarity inversion sequence and shown by FIG. 2g is obtained as a superimposed signal on the equalized reproduced pulse corresponding to each magnetic polarity inversion. An intersymbol interference occuring in this case is limited to that between an information point at an amplitude of +A or −A of an equalized reproduced pulse prior to the equalized reproduced pulse becomes continuous and the information point at an amplitude of −A or +A of the equalized reproduced pulse after a point at which the equalized reproduced pulse became continuous. In this manner, use of the partial response system enables to decrease the magnetic polarity inversion spacing even when a relatively large intersymbol interference occurs thereby increasing the linear bit density.

When the absolute value of the sampled value of the equalized reproduced signal is larger than a constant value, for example A/2, the equalized reproduced signal is converted into "1" whereas when the absolute value is smaller than the constant value, the equalized reproduced signal is converted into "0" to obtain amplitude detection bit as shown in FIG. 2h. On the other hand, when the amplitude detection bit corresponding to a given inversion detection bit and the amplitude detection bit just before the given inversion detection bit are both "1" or when the polarities of their sampled values are different, the equalized reproduced signal is converted into "1" whereas in the other cases converted into "0" to obtain other an inversion detection bit as shown in FIG. 2i.

A combination of an amplitude detection bit and an inversion detection bit is equivalent to a three valued digit sequence $$b_0, b_1, b_2 \ldots$$

obtained by converting a magnetic polarity inversion sequence.

$$a_0, a_1, a_2 \ldots$$

where $a_i$ represents by 1 or $-1$ a magnetic polarity inversion in which two N poles oppose each other or two S poles oppose each other and by "0" magnetic polarity non invertion, and i represents a position in the magnetic polarity inversion sequence. And $$b_j = a_{j-1} a_1$$

FIG. 1 also shows amplitude detection bits and inversion detection bits obtained in the same manner. A symbol X in FIG. 1 shows that a bit becomes "0" or "1" according to a previous state. A data word is decoded from an amplitude detection bit and an inversion detection bit but in this embodiment the data word and the record word are related such that the second to the fourth bit of the amplitude detection bits form a data words. When the fourth bit of the inversion detection bits is "1", the fourth bit of the amplitude detection bits is changed to "0". In other words, the last bit of the data word is made to "0". Consequently, a data word "010" shown in FIG. $2_j$ is reproduced from the information shown in FIGS. $2h$ and $2i$.

FIG. 3 illustrates a construction of a recording apparatus utilized to carry out the recording and reproducing method of this invention. The recording apparatus shown in FIG. 3 comprises a buffer 11 which temporarily stores an inputted data words (in this example 3 bit construction) according to a clock pulse CP1 supplied from a timing pulse generator 12, and an encoder 13 which converts the data word outputted from the buffer 11 into a recording word according to the conversion table shown in FIG. 1 for the purpose of recording the data word on a magnetic recording medium, for example a magnetic tape. The encoder 13 includes a read only memory device ROM 13a which is connected to receive the output of the buffer 11 comprising a lower order address bit and the output of an exclusive-OR gate circuit 13b, which comprises the most significant bit for producing an output converted into a record word. The input and output conditions of the ROM follow the conversion table shown in FIG. 1 and the ROM contains a conversion table as shown in the following Table I, for example. The first bit, i.e., the most significant bit of the ROM addresses shown in Table I is determined by the output of the exclusive-OR gate circuit, while the second to fourth bits represent a data word supplied from the buffer 11.

TABLE I

| ROM input address | | ROM output |
|---|---|---|
| decimal | binary | (record word) |
| 0 | 0000 | 1111 |
| 1 | 0001 | 0001 |
| 2 | 0010 | 1101 |
| 3 | 0011 | 0010 |
| 4 | 0100 | 0111 |
| 5 | 0101 | 0110 |
| 6 | 0110 | 0101 |
| 7 | 0111 | 1010 |
| 8 | 1000 | 1111 |

TABLE I-continued

| ROM input address | | ROM output |
|---|---|---|
| decimal | binary | (record word) |
| 9 | 1001 | 1110 |
| 10 | 1010 | 1101 |
| 11 | 1011 | 0010 |
| 12 | 1100 | 0111 |
| 13 | 1101 | 1001 |
| 14 | 1110 | 0101 |
| 15 | 1111 | 1010 |

The output P of a parity calculator 17 and the output C of a charge calculator 18 to be described later are applied to the inputs of the exclusive-OR gate circuit 13b.

As can be noted from the conversion table shown in FIG. 1, the output of the encoder 13 is made up of 4 bits which are applied in parallel to shift register 15.

The encoder 13 is provided for the purpose of converting a data word into a record word when the DC component of the NRZI recording current is to be eliminated, and for selecting one of two record words, the polarities of the record word charges being different, such that the integrated value (charge) of the NRZI recording current would be less than a definite positive or negative value. As will be described later, the parity calculator 18 is used to check whether the NRZI recording current of a record word begins from positive or negative value. With this measure it is possible to convert data of any pattern into a limited recording current waveform. The shift register 15 has a 4 bit construction and is supplied with a preset pulse PP, a clock pulse CP2, and a clear pulse CL from a timing pulse generator 12 to change its content. The shift registes 15 sends out serially its content under the control of the clock pulse CP2, and the output of the shift register 15 is applied to the parity calculator 17 and the charge calculator 18. The parity calculator 17 calculates the parity during an interval of the foremost bit of the leading record word and a bit now being inputted so as to calculate the polarity of the recording current. In the case of an odd numbered parity, an output P of "1" is sent to the encoder 13, while in the case of an even numbered parity an output "0" is applied to the encoder. In this example, the parity calculator 17 is constituted by a J-K master-slave flip-flop circuit 17a which when supplied with the clear pulse CL resets to produce a Q output of "0" whereas when supplied with the clock pulse CP2 changes its state when the output of the shift register 15 is "1" but does not change its state when the output of the shift register 15 is "0". The charge calculator 18 is constituted by a J-K master-slave flip-flop circuit 18a, 4 bit up-down counter 18b and AND gate circuits 18c and 18d. The charge calculator 18 calculates the integrated value of the recording current by alternately enabling and disabling AND gate circuits 18b and 18c under the control of the clock pulse CP3 when a bit "1" is inputted from the leading bit of the first record word so as to switch the operation between count up and count down and by counting the number of the input bits with the counter 18d. When the integrated value is larger than zero the charge calculator applies its "0" output to the encoder 13 whereas an "1" output to the encoder 13 when the integrated value is negative. When supplied with the clear signal CL, the flip-flop circuit 18a and the flip-flop circuit 18d are reset.

The NRZI modulator 16 converts the bits of an inputted record word into a NRZI recoring current which is sent to a recording head 20 via a rotary transformer 19. The NRZI modulator 16 converts a bit "1" of the record word to an inverted NRZI recording current and converts a bit "0" of the record word into a noninverted NRZI recording current and operates to decrease the spacing between detected digits which undergo interference when combined with a partial response. With this modulator, the bit "1" is recorded on the recording medium as the magnetic polarity inversion. Accordingly, a reproduced pulse is produced at a bit "1", and this reproduced pulse is read as (+1, +1) (clase 1 partial response). One bit on the recording side becomes two continuous bits on the reproducing side. Thus, a detected digit interferred by an adjacent record bit is only one adjacent bit.

Heretofore an NRZ modulator has been used to provide a class 4 partial response (interleaved NRZI). According to this modulator, since the recorded bit "1" is read as a detected digit "(1,0,−1)" the detected digits that result in an interference are adjacent two bits. In the prior system, for the purpose of avoiding error propagation a m/n conversion was used. According to this invention $n = m + 1$, but according to the class 4 partial response $n = m + 2$. As a consequence, the system of this invention has a higher conversion efficiency, i.e., a higher linear bit density.

By rotating the rotary head at a high speed, the rotary transformer 19 increases the relative speed of the head and the recording medium, for example larger than 20 m/s (in the case of a stationary head 5 m/s), thus making easy the positioning of the tape and the head by using suitable servo technique. In this case, it is necessary to record a positioning signal on the tape. This increases the reproduced signal, the SNR ratio, the linear bit density and the track density.

The operation of the recording apparatus shown in FIG. 3 will now be described with reference to the waveforms shown in FIGS. 4a through 4o.

A clear pulse CL (FIG. 4a) produced by the timing pulse generator 12 at time $t_1$ clears the shift register 15, the flip-flop circuit 17a of the parity calculator 17, and the flip-flop circuit 18a and up-down counter 18d of the charge calculator 18, thus setting an initial state. Under these conditions contents of the shift register 15 are all zero and the outputs P and C or the parity calculator 17 and the charge calculator 18 are both "0". Then, when a clock pulse CP1 is produced by the pulse generator 12 at time $t_2$ as shown in FIG. 4b a three bit data word, for example "001" is written into the buffer 11. Thereafter, the buffer 11 sends its content to the encoder 13 as shown in FIG. 4c. The encoder 13 utilizes this buffer output as a lower address bit of the read out address. At this time the parity calculator 17 and the charge calculator 18 still keeps their initial states and their outputs P and C are "0". As a consequence, the output of the exclusive-OR gate circuit 17b inputted with these outputs is also "0".

Accordingly, the address designation input to the ROM is "0001" (see FIG. 4d) and when the address of this ROM is designated, "0001" would be outputted as the ROM output, that is a record word (see FIG. 4e) according to Table I.

At this time since the shift register 15 produces a "0" output, the states of the parity calculator 17, the charge calculator 18 and the NRZI modulator 16 do not change.

At time $t_3$, as shown in FIG. 4f, the timing pulse generator 12 produces a preset pulse PP. When supplied with this preset pulse PP, the shift register 15 stores the record word sent from the encoder 13 in parallel. Then the contents of the shift register 15 which have been stored under the control of a clock pulse CP2 shown in FIG. 2g are sequentially read out.

At time $t_3$, the clock pulse CP2 is not generated by the timing pulse generator 12. Accordingly, the output "0" of the most significant bit of the shift register 15 is sent to the parity calculator 17, the charge calculator 18 and the NRZI modulator 16. Since this output is the same as the initial state, the states of the most of the elements do not change. However, as the AND gate circuit 18b is enabled by the Q output "1" of the flip-flop circuit 18a it sends to the counter 18d a clock pulse CP3 as a count down pulse (see FIG. 4l) each time the clock pulse CP3 is generated at time $t_4$, thus causing the counter 18d to count down. The content of the counter 18d is shown in FIG. 4m. As shown in FIG. 4n, the most significant bit of the counter 18d becomes "1" thereby changing its output C to "1" from "0".

At this time, since the flip-flop circuit 17a of the parity calculator 17 is inputted with "0", its output P is still "0". As a consequence, output "1" is sent out from the exclusive-OR gate circuit 13b of the encoder 13. (see FIG. 4o)

At time $t_5$ the timing pulse generator 12 produces a clock pulse CP2 as shown in FIG. 4g. In response to this clock pulse, the content of the shift register 15 is shifted by one bit toward the output side. Succeeding output of the shift register 15 is "0" which is the same as that before "0". Thus, the inputs to the flip-flop circuits 17a and 18b respectively of the parity calculator 17 and the charge calculator 18 are "0" and when a clock pulse CP3 i.e. applied at time $t_3$ their states do not change. However, since the AND gate circuit 18b is still being applied with the Q output of the flip-flop circuit when it is supplied with the clock pulse CP3, the AND gate circuit 18b sends again a count down pulse to the counter 18d. As a consequence, the count of the counter 18d is counted down by 1 to change its content to −2.

The operations when the timing pulse generator 12 produces clock pulse CP2 and CP3 at times $t_7$ and $t_8$ respectively are similar to those when the clock pulses CP2 and CP3 are generated at times $t_5$ and $t_6$ respectively. When supplied with a count down pulse, the up-down counter changes its content to −3.

Upon generation of a clock pulse CP2 at time $t_9$, the content of the shift register 15 is shifted as that the least signiciant bit, that is "1" of the content of a data word is sent out as the output of the shift register 15.

The NRZI modulator 16 sequentially converts the record word "0001" supplied from the shift register into "0"0"0"1" and sends the converted signal to the head 20 via the rotary transformer 19. It is herein assumed that the initial state of the recording current is "1". (see NRZI recording current shown in FIG. 6)

When a clock pulse CP3 is generated at time $t_{10}$, the states of the flip-flop circuits 17a and 18a respectively of the parity calculator 17 and the charge calculator 18 are changed to change the Q output to "1" from "0" (see FIG. 4j). As a consequence the output P of the parity calculator 18 becomes "1". As a result of change of the state of the flip-flop circuit 18a of the charge calculator 18 when a Q output is produced, the AND gate circuit 18b would be disabled which has been enabled by the clockpulse CP3, and the AND gate circuit 18c sends out a count up pulse shown in FIG. 4k when it receives the clock pulse CP3 with the result that the content of the counter 18d is changed to −2 from −3. However, since the most significant bit of this counter is still maintained at "1" its output C does not change and remains at "1" as shown in FIG. 4h.

Under these conditions since either one of the outputs P anc C is "1" the exclusive-OR gate circuit 13 sends an output "0" as shown in FIG. 4o.

At time $t_{12}$, the clock pulse CP1 is produced again to store the next data word "010" in the buffer 11. At this time, since the exclusive-OR gate circuit 13b does not send out "1" as the most significant bit (see FIG. 14o) "0010" will be applied as an input to the ROM 13a. Accordingly, the ROM 13a sends "1101" (see FIG. 4e) as the record word to the shift register 15 according to Table I.

The shift register 15 accepts the output of ROM 13a when a preset pulse PP is applied at time $t_{13}$. At this time, "1" appears at the most significant bit that is the output terminal of the shift register 15 (see FIG. 4h). As a consequence the flip-flop circuits 17a and 18b of the parity calculator 17 and the charge calculator 18 operate as follows. Remember that the last bit of the previous data word is "1". This sets the flip-flop circuits 17a and 18a to change their Q outputs to "1". Under these states, when signal "1" is applied again to the flip-flop circuits they are reset to change their Q output to "0"; with the result that the output P of the parity calculator 17 becomes "0". At the same time, the output C of the charge calculator 18 becomes "0" and the Q outputs of the flip-flop circuits 17a and 18a become "1" so that the AND gate circuit 18b is enabled when it receives the clock pulse CP3 to supply a count down pulse (see FIG. 4l) to the counter 18d to change its count −2 to −3. At this time, since the most significant bit of the counter 18d is still "1", the output C of the charge calculator 18 is "1".

Then when a clock pulse CP2 is supplied to the shift register 15 at time $t_{20}$ the content thereof is shifted by one bit toward the most significant bit to produce an output "1" at the output terminal.

As a consequence, upon receival of a next clock pulse CP3, the flip-flop circuit 17a of the parity calculator 17 is set to produce an output C of "1". At the same time, the flip-flop circuit 18a of the charge calculator 18 produces a Q output of "1", and when the clock pulse CP3 is supplied, the AND gate circuit 18c is enabled to send out a count up pulse (see FIG. 4k). Thus, the count of the counter 18d is changed to −2 from −3.

Furthermore, when the clock pulse CP2 is applied to the shift register 15 at time $t_{21}$, the content thereof is shifted again by one bit toward the most significant bit to produce an output "0" at the output terminal (see FIG. 4h).

At this time, even when the clock pulse CP3 is applied, states of the flip-flop circuits 17a and 18a respectively of the parity calculator 17 and the charge calculator 18 do not change and continue to send out Q output of "1" as shown in FIG. 4j. As a consequence, the parity calculator 17 continues to produce output P of "1" and the counter 18d of the charge calculator 18 changes its count from −2 to −1 upon receival of a count up pulse produced by the AND gate circuit 18c.

Thereafter, the parity calculator 17, the charge calculator 18 and the encoder 13 operate sequentially according to the output of the shift register 15.

When supplied with a record word "1101", the NRZI modulator 16 supplies a NRZI recording current of "0110" to the head 20 via the rotary transformer 19, whereas when supplied with a next record word "1101" the modulator 16 supplies a NRZI current "1110" to the head 20 which in response to this current sequentially magnetizes predetermined portions of the magnetic tape.

Figure 5:
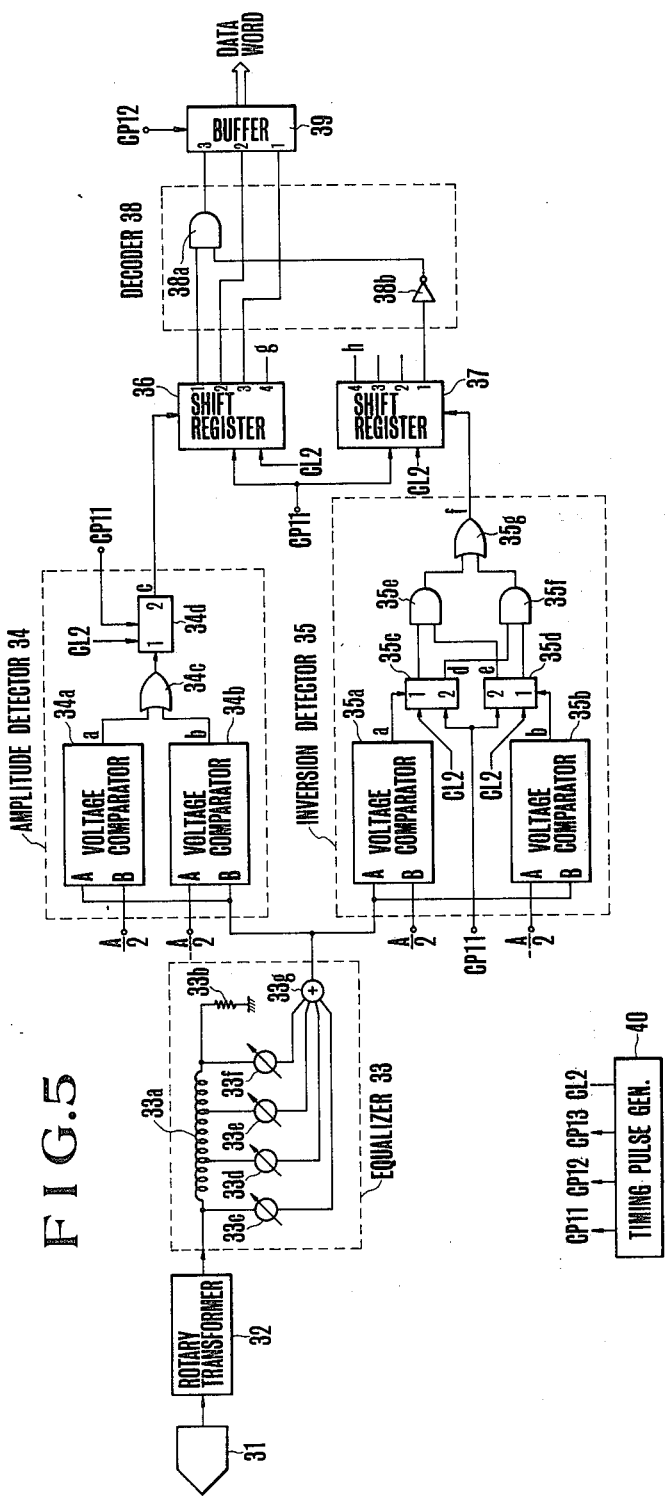
FIG. 5 is a block diagram showing preferred embodiment of a reproducing apparatus according to this invention.

FIG. 5 shows the construction of a reproducing apparatus utilized in the recording and reproducing system according to this invention, which comprises a reproducing head 31, a rotary transformer 32 connected to receive the output of the reproducing head 31, an equalizer 33 supplied with the output of the rotary transformer 32, an amplitude detector 34 supplied with the output of the equalizer 33, an inversion detector 35 supplied with the output of the equalizer 33, shift register 36 and 38 supplied with the outputs of the amplitude detector 34 and the inversion detector 35 respectively, a decoder 38 supplied with the parallel outputs of the shift registers 36 and 37, a buffer 39 supplied with the output of the decoder 38 and a timing pulse generator 4o. The equalizer 33 equalizes the reproduced pulse such that its sampled values are equalized to a class 1 partial response signal . . . 0, 0, +A, +A, 0, 0 . . . . Use of this equalizer permits waveform interference so that correct reading can be assured even with a narrow magnetic polarity inversion spacing, that is with larger linear bit density. The equalizer 33 is constituted by a tapped delay line 33a, a resistor 33b connected between one end of the delay line and the ground, variable gain amplifiers 33c–33f connected to the opposite ends of the delay line 33a and intermediate taps, and an adder 33g which adds together the outputs of the amplifiers. Such construction is called a tapped transversal filter which equalizers the magnitude and polarity of the input signals, i.e., the reproduced pulses to obtain an equalized reproduced pulse whose waveform is currented. However, detailed description will not be made herein because its construction is well known. The equalizer shown may be substituted by an equalizer of the well known construction, for example utilizing reactance, capacitance and resistors.

The amplitude detector 34 operates to produce a logic signal "1" when the absolute value of the sampled value is larger than a predetermine value, but a logic signal "0" in other cases. The amplitude detector 34 comprises two voltage detectors 34a and 34b, an OR gate circuit 34c, and a 2 bit shift register. Each of the voltage comparators 34a and 34b has input terminals A and B, the A input of the comparator 34a and the B input of the comparator 34b being connected in common to receive the output of the equalizer 33. Further, a reference voltage A/2 is applied to the B input of the comparator 34a, while a reference voltage −A/2 is supplied upon the A input of the comparator 34b. When the voltage of the A input is higher than the voltage of the B input of these comparators, a high level logic output "1" is produced, while in the opposite case a low level logic output "0" is produced. These outputs are supplied to a shift register 34d via an OR gate circuit 34c. The shift register 34d stores the output of OR gate circuit 34c under the timing action of the clock pulse CP11 and the output of the shift register 34d is applied to a series input/parallel output type 4 bit shift register 36. The shift register 34d stores its input under the control of the timing pulse CP13.

The inversion detector 35 produces an output "1" when it detects a sampled value of opposite polarity whose magnitude is larger than a predetermined value after the detector 35 detects a sampled value having a magnitude larger than the predetermined value, whereas produced "0" in other cases. The inversion detector 35 comprises a pair of voltage comparators 35a and 35b, a pair of two bit shift registers 35c and 35d, two AND gate circuits 35e and 35f and an OR gate circuit 35g. Each of the comparators 35a and 35b has two inputs A and B, and the A input of the comparator 35a and the B input of the comparator 35b are connected in common to receive the output of the equalizer 33. The B input of the comparator 35a is supplied with a reference voltage A/2 while the A input of the comparator 35b is supplied with a reference voltage −A/2. When the voltage at the A input becomes larger than that at the B input these voltage comparators produce outputs "1s", while in the opposite case outputs "0s". These outputs are serially applied to the shift registers 35c and 35d to be sequentially stored therein under the control of the clock pulse CP11. The AND gate circuit 35e is enabled when the first bit of the shift register 35c and the second bit of the shift register 35d coincide with each other so as to check whether the information has inverted or not. The AND gate circuit 35f is enabled when the second bit of the shift register 35c and the first bit of the shift register 35d coincide with each other. The outputs of the AND gate circuits 35e and 35f are applied to the series input parallel output type 4 bit shift register 37 via the OR gate circuit 35g as the output of the inversion detector 35.

Above described amplitude detector 34 and inversion detector 35 process three valued informations read with binary logic circuits. According to class 1 partial response method. The use of these detectors enables to use binary logic circuits, thus making the apparatus small in size and decreasing the cost.

The shift register 37 stores input data under the control of the clock pulse CP13.

The operation of the reproducing apparatus shown in FIG. 5 will now be described in detail with reference to FIGS. 6a–6o.

Assume now that the data words appear in the order of "001", "01" and "101" as shown in FIG. 6a, then the record words recorded on the magnetic tape are shown in FIG. 6b. Accordingly, as shown in FIG. 6c, the NRZI recording current for recording these record words on the magnetic tape is inverted only at a bit "1". The reproduced signal picked up by the reproducing head 31 and then equalized by the equalizer 32 is shown by FIG. 6d. The equalized reproduced signal is applied to the amplitude detector 34 and to the inversion detector 35. At times $t_{31}$ and $t_{32}$ the equalized reproduced signal is zero so that respective voltage comparators 34a, 34b, 35a and 35b do not produce any output. FIGS. 6e and 6d show output waveforms at the output terminals a and b of the voltage comparators 34a, 35a, 34b and 35b. Each of the shift registers 34d, 35c, 35d, 36 and 37 is set to the initial state by a clear signal CL at the beginning of reproduction.

From time $t_{32}$, the equalied reproduced signal gradually increases in the positive direction. At time $t_{33}$, since the equalized reproduced signal becomes larger than the reference value A/2 applied to voltage comparators 34a and 35a, "1s" are sent out from the output terminals a of these comparators 34a and 35a. These outputs are continued until the reproduced signal becomes smaller than A/2 at time $t_{35}$. This state is shown in FIG. 6e. The "1" output of the voltage comparator 34a is stored in the first bit of the shift register 34d via the OR gate circuit 34c under the control of the clock pulse CP11 generated at time $t_{34}$ shown in FIG. 6g, while the output of the voltage comparator 35c is stored directly in the shift register 35c at the same time under the control of the clock pulse CP11. The "1" informations stored in these shift registers 34d and 34e are shifted to the second bits respectively under the control of the clock pulse CP11 generated at time $t_{36}$. As a consequence, an output as shown in FIG. 6h appears on the output terminal of the shift register 34d and an output as shown in FIG. 6i appears on the output terminal d of the shift register. Under these states, the output of the voltage comparator 35b would not be applied to shift register 35d at either one of the times $t_{34}$ and $t_{35}$. Consequently, at these times neither one of the AND gate circuit 35e and 35f is enabled.

At time $t_{39}$ (in this example, this time accidentaly coincides with the processing time described above) the equalized reproduced signal passes through a zero level and varies in the negative direction until time $t_{37}$. However, it should be understood that the equalized reproduced signal changes in a range in which the voltage comparators 34b and 35b do not produce any output.

The shift register 36 stores the output C of "1" of the shift registers 34d under the control of the clock pulse CP11 generated at time $t_{37}$ and thereafter sequentially shifts this "1" information from the first bit towards the higher order bit each time the clock pulse CP11 is aplied.

At time $t_{38}$ when the equalized reproduced signal exceeds again reference value A/2, the voltage comparators 34a and 35a produce outputs "1" which are stored respectively in a manner described above, and at time $t_{40}$ these stored signals are produced from the output terminals c and d of the shift registers under the control of the clock pulse CP11. These outputs are produced because the equalized reproduced signal crosses a level A/2 and approaches toward zero at time $t_{41}$.

The shift register 36 stores the output C of the shift register 34d under the contrl of clock pulse CP11 consequently the output C of "1" produced at time $t_{36}$ is stored in the shift register 36 at time $t_{32}$, and the shift register 36 produces an output whose first bit is "1" and the second and third bits are "0". The shift register 35c of the inversion detector 35 produces an output d of "1" at a time $t_{36}$, but at time $t_{37}$ its contents overflows to produce an output d of "0". For this reason at time $t_{37}$ the output f of the inversion detector 37 is "0" so that "0" is stored in the first bit of the shift register 37. Accordingly, at time $t_{37}$, the inverter 38b of the decoder 38 supplies an output "1" to the AND gate circuit 38a whereby it is enabled to supply the output "1" to the buffer 39 which stores the output of the recoder 38 at time $t_{39}$ following time $t_{37}$ under the control of the clock pulse CP12. At this time, the output of the AND gate circuit is "1" and the second and third bits of the shift register 3o are "0", so that a data word "001" shown in FIG. 6o is stored in the buffer 39, and the stored data word is sent to a succeeding stage as a reproduced data word.

At time $t_{44}$ since the equalized reproduce signal becomes smaller than the reference value A/2, at time $t_{41}$ the voltage comparators 33a and 35a stop to send out outputs "1". At time $t_{42}$ the equalized reproduced signal passes through the zero level and then begins to vary in the negative direction, and at time $t_{43}$ the equalized reproduces signal passes through the level of $-A/2$. At this time the voltage comparators 34b and 35b produce "1" outputs at their output terminals b. These "1" outputs are produced until the equalized reproduced signal becomes smaller than $-A/2$ at $t_{45}$. It is to be noted that, as can be noted from the waveforms shown in FIGS. 6d, 6e, 6f and 6g the outputs a of the voltage comparators 34a and 35a and the outputs b of the voltage comparators 34b and 35b are generated with a small time spacing and stored in the succeeding registers by a continual clock pulse CP11.

Consequently, as shown in FIG. 6h output "1" appears at the output terminal c of the shift register 34a at either one of time $t_{44}$ and $t_{46}$. This "1" output is sent to shift register 36 and sequentially stored in the first bit thereof each time a clock pulse CP11 is generated. The content of the shift register 36, especially the contents of the first, second and third bits ar sent to the decoder 38 where they are decoded and then sent to the buffer 39. However, as shown in FIG. 6h, since this buffer stores the output of the decoder 38 under the control of the clock pulse CP12, the variation in the output of the decoder during an interval in which the clock pulse CP12 is generated has no influence upon the output side.

Figure 6:
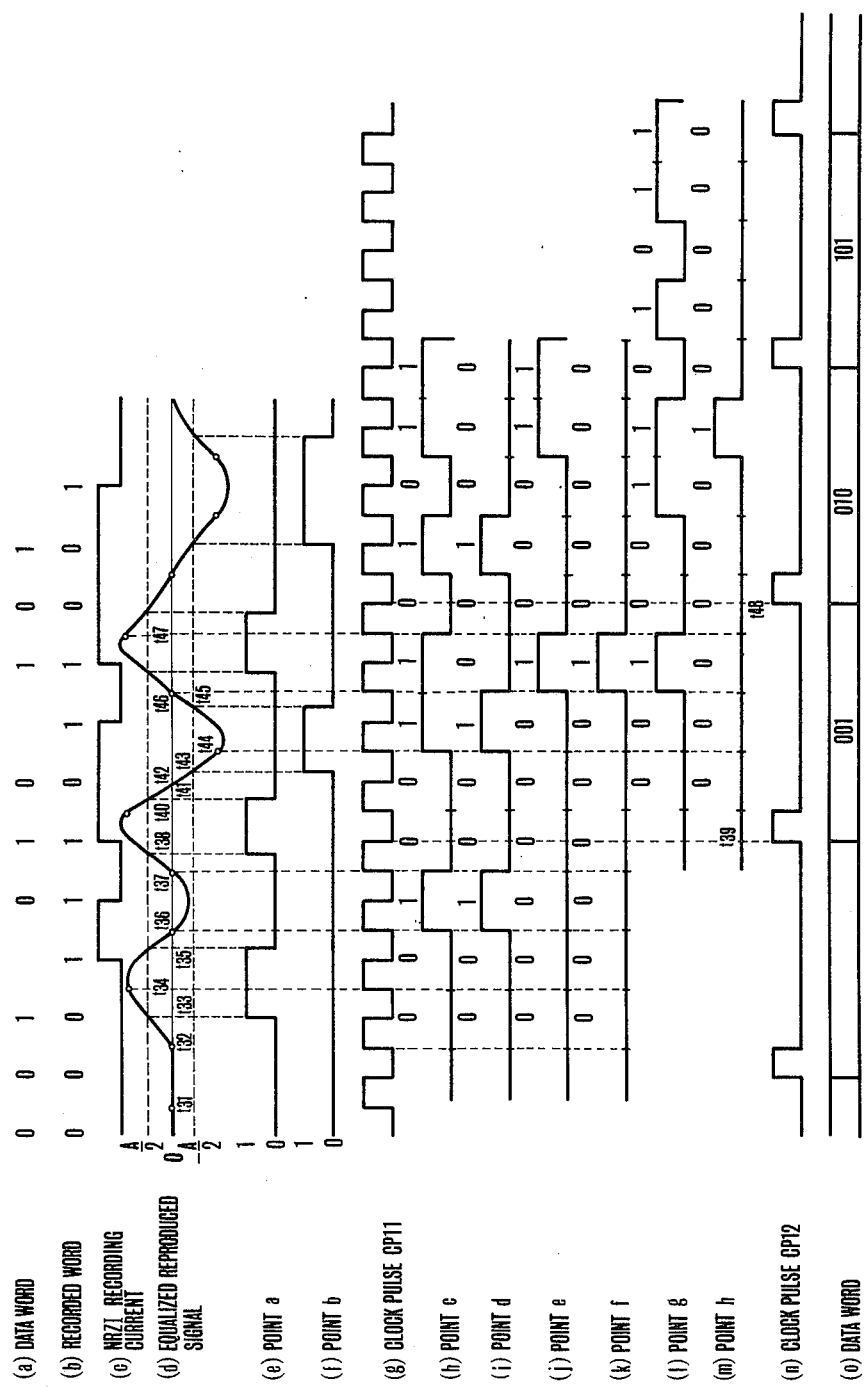
FIGS. 6a through 6o are waveforms of various portions and are useful to expalin the operation of the reproducing apparatus shown in FIG. 5.

At time $t_{40}$, the shift register 35e stores the output "1" appearing at the output terminal of the voltage comparator 35a and at time $t_{44}$ this information "1" is shifted from the first bit to the second bit connected to the output terminal d. This state is shown in FIG. 6i. At time $t_{44}$ the shift register 35d stores the "1" output appearing at the output terminal b of the voltage comparator 35b. At this time, an output "1" appears on the output terminal of the shift register 35c. As a consequence, the AND gate circuit 35f is enabled to produce an output "1" on the output terminal f of the inversion detector 35 via the OR gate circuit 35g (see FIG. 6 k). At time $b_{45}$, the voltage comparator 35b stops to produce an output. At time $t_{46}$, the shift registers 36 and 37 respectively store the output C of the amplitude detector 34 and the output f of the inversion detector 34 under the control of the clock pulse CP11 produced at time $t_{46}$. Then at time $t_{47}$ the "1" shift informations of the first bits of the shift registers 36 and 37 are shifted to the second bits.

Under this state, the buffer 39 stores an input under the control of the clock pulse CP12 generated at time $b_{48}$. Since the inputs to the AND gate circuit 38a of the decoder 38 are "0" and "1", this gate is not enabled so that this AND gate circuit applies its "0" output as the third bit input of the buffer 39. Further, the second bit of the shift register 36 is "1", so that this signal "1" is sent to the buffer 39 as the second bit input. Since the third bit of the shift register 36 is "0", this "0" information is sent to the buffer 39 as the fourth bit input. As a consequence, the buffer 39 sends out a data word "010" shown in FIG. 6o.

Thereafter various elements operate in the same manner as above described to reproduce a data word "101" and succeeding data words are sequentially reproduced. The waveforms shown in FIGS. 6l and 6m show those of the fourth bits of the shift registers 36 and 37.

Figure 7:
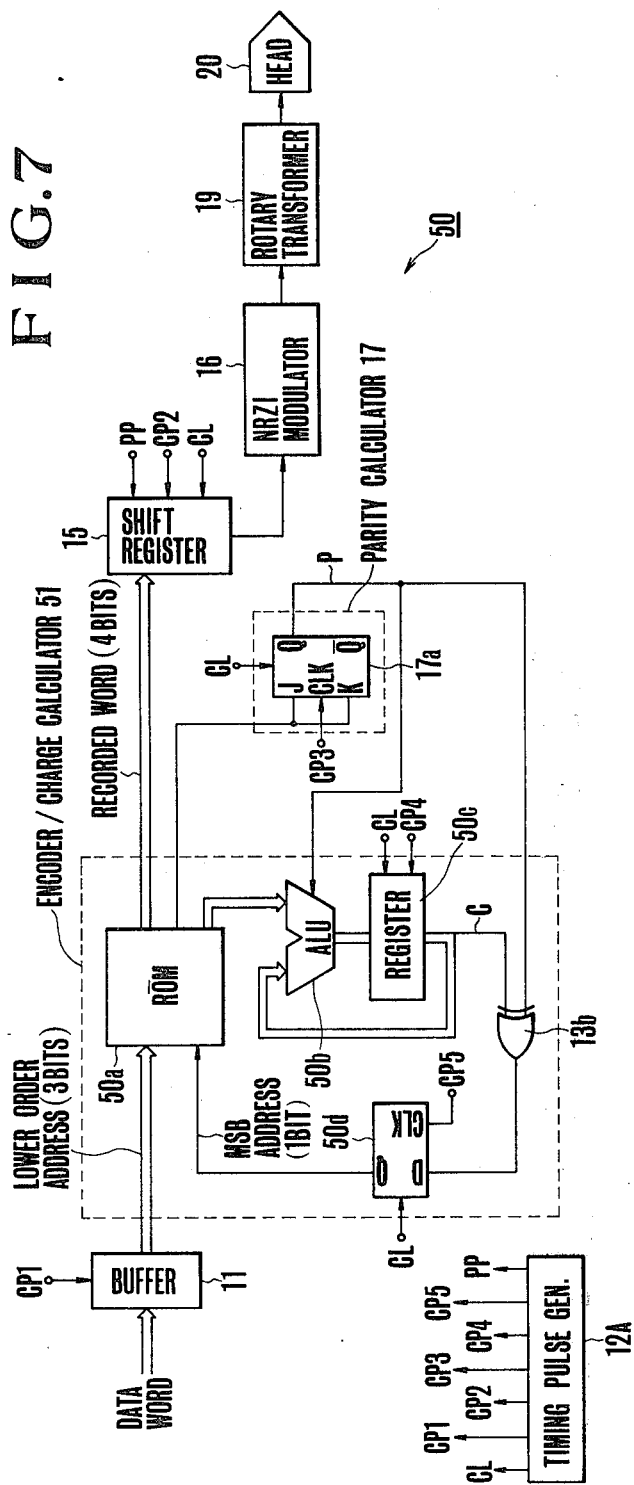
FIG. 7 is a block diagram showing a modified recording apparatus embodying the invention.

FIG. 7 shows a modified recording apparatus in which elements identical to those shown in FIG. 3 are designated by the same reference charactors. The recording apparatus shown in FIG. 7 is characterized in that the encoder 13 and the charge calculator 18 shown in FIG. 3 are combined into a single processing unit, i.e., an encoder/charge calculator 51 which is constituted by a read only memory device (ROM) 50a, an arithmetic operation unit 50b, a register 50c, an exclusive-OR gate circuit 13b and a D-type edge triggered flip-flop circuit 50d. Like the ROM 13a shown in FIG. 3, the ROM 50a receives a three bit data words sent through the buffer 11 as a lower order address and an one bit sent from the exclusive-OR gate circuit 13b via the flip-flop circuit 50d as the most significant bit for producing a 4 bit record word, a one bit parity and a 3 bit record word charge based on these inputs and according to the following conversion Table II

TABLE II

| ROM address | | ROM output | | |
|---|---|---|---|---|
| decimal | binary | record word | parity | record word charge |
| 0 | 0000 | 1111 | 0 | 000 |
| 1 | 0001 | 0001 | 1 | 010(+2) |
| 2 | 0010 | 1101 | 1 | 000 |
| 3 | 0011 | 0010 | 1 | 000 |
| 4 | 0100 | 0111 | 1 | 000 |
| 5 | 0101 | 0110 | 0 | 010(+2) |
| 6 | 0110 | 0101 | 0 | 000 |
| 7 | 0111 | 1010 | 0 | 000 |
| 8 | 1000 | 1111 | 0 | 000 |
| 9 | 1001 | 1110 | 1 | 110(−2) |
| 10 | 1010 | 1101 | 1 | 000 |
| 11 | 1011 | 0010 | 1 | 000 |
| 12 | 1100 | 0111 | 1 | 000 |
| 13 | 1101 | 1001 | 0 | 110(−2) |
| 14 | 1110 | 0101 | 0 | 000 |
| 15 | 1111 | 1010 | 0 | 000 |

The record words are sent to the shift register 15 in the same manner as the preceeding embodiment, while the parity check information is sent to the parity calculator 17. The record word charge information is sent to the arithmetic calculating unit 50b which also receives the output of the shift register 50c in addition to the record word charge information. Based on the output P of the parity calculator 17 the arimetic opeation unit (ALU) 50b determines whether the record word charge is to be added or subtracted to and from the output of register 50c. For example, when the output P is "1", the arithmretic unit becomes an addition mode. On the other hand, when the output is "0," the arithmetic unit becomes the subtraction mode.

The result of operation of the arithmetic operation unit 50b is stored in register under the control of the clock pulse CP4. The register 50c is set to the initial state by the clear signal CL. The most significant bit of the register 50c is sent to the exclusive-OR gate circuit $13_{b1}$ to act as the output C that is the output of the charge calculator. The output P of the parity calculator 17 is also applied to the exclusive-OR gate circuit $13_{b1}$. Thus, this OR gate circuit, calculates the exclusive-OR logic of the outputs P and C and applies its output to the flip-flop circuit 50d which stores the output of the exclusive-OR gate circuit $13_{b1}$ each time a clock pulse CP5 is generated and sends out its output as the most significant bit address designation information of the ROM 50a. The timing pulse generator 12A utilized in this modification produces clock pulses CP4 and CP5 in addition to the output CL, CP1–CP3 and PP which are generated by the timing pulse generator 12 shown in FIG. 3.

The operation of this recording apparatus will now be described with reference to the waveforms shown in FIG. 8.

The clear pulse CL (FIG. 8a) generated by the clear pulse CL generated by the timing pulse generator 12A at a time $t_{51}$ clears the shift register 15, the flip-flop circuit 17a of the parity calculator 17, the register 50c of the arithmetic operation unit 51 and the flip-flop circuit 50d and sets these circuit elements to their initial states. Under these states, the contents of the shift register 15 are all zero and the output P of the parity calculator 17 and the output C of the arithmetic operation unit 51 are both zero.

Then, as shown in FIG. 8b, the clock pulse CP1 is generated at time $t_{52}$ to store a bit 3 data word, for example "001" in the buffer 11. Consequently, thereafter the buffer 11 continues to send its content to the arithmetic operation unit 51 until the content of the buffer 11 is updated by the clock pulse CP1 as shown in FIG. 8c. The arithmetic operation unit 51 utilizes the output of the buffer as a lower order address bit of the read out address of the ROM 50a.

At this time, the parity calculator 17 and the register 50c of the arithmetic operation unit 51 are still maintained in their initial states and the both outputs P and C are "0". Accordingly, the output of the exclusive-OR gate circuit $13_{b1}$ of the arithmetic operation unit 51 supplied with these outputs P and C is "0" and hence the output of the flip-flop circuit 50d is also "0".

Consequently, as shown in FIG. 8d the address designation input to the ROM 50a becomes "0001" and the address designation of this ROM is made to be a ROM output of "0001," that is a record word "0001". Then a parity check information of "1" and a record word charge information of "+2(010)" are sent out (see FIG. 8e) according to Table II. The shift registor 15 stores in parallel the record word "0001" when the clock pulse PP shown in FIG. 8f is generated. Then the shift register 15 sequentially sends to the NRZI modulator 16 its content which has been stored by the clock pulse CP2 shown in FIG. 8g starting from the most significant bit. FIG. 8h shows the variation of the output sent out from the shift register 15.

The NRZI modulator 16 supplies a NRZI recording current of "0001" to the head 20 via the rotary transformer 19 according to the conversion table shown in FIG. 1 as the clock pulse CP2 is generated so as to write this record word of "0001" on the magnetic tape.

The +2 (010) record word charge information generated at the time when ROM 51 converts the sign in response to the output of the buffer 11 when the clock pulse CP1 is generated is sent to the arithmetic operation unit 50b. At this time, the output P of the parity calculator 17 is "0" (FIG. 8j) and the arithmetic operation unit 50b is at the subtractive mode (FIG. 8k). At this time, since the register 50c is storing "000," the record word charge information is applied with a negative sign thus becoming −2, which is supplied to the shift register 50c. This shift register stores −2 at time $t_{53}$ when the clock pulse CP4 shown in FIG. 4f is generated. Thus, −2 is outputted as the output of the register 50c (see FIG. 8l). At this time, the output C is "1" (FIG. 8m). At this time, although the exclusive-OR gate circuit $13_{b1}$ produces an output "1", the flip-flop circuit 50d is not in a state of receiving this output "1".

Then at time $t_{54}$ the clock pulse CP2 (FIG. 8g) which sequentially shifts the content of the shift register 15 is generated, while at the same time, the clock pulse CP3 (see FIG. 8i) that enables the flip-flop circuit of the parity calculator 17 is also generated. Upon receival of this clock pulse, the parity calculator 17 stores a parity information "1" sent out from ROM 51 when it receives the output of buffer 11 when the clock pulse CP1 is generated thereby producing an output P of "1" (see FIG. 8j). When the output P becomes "1", the mode of the arithmetic operation unit 51 is transferred to the addition mode. Since at this time the exclusive-OR gate circuit $13_{b1}$ is supplied with outputs P and C (both "0") the AND gate circuits $17_{b3}$ and $17_{b4}$ would not be enabled thus sending out "0". At this state, the clock pulse CP5 is supplied to the flip-flop circuit 50d so that it is reset to send a Q output of "0" to the ROM 51.

When the next data word "010" is applied to the buffer 11 this data word is sent to the ROM 51 to act as a lower order address bit of the ROM as shown in FIG. 8c. At this time, since the flip-flop circuit 50d is sending out "0" as its Q output, the address input to the ROM 51 becomes "0010". At this time the output of ROM 51 becomes "1101/1/0" according to Table II. The operation sending and storing the record word "1101" in the shift register 15 is the same as that described above. The parity calculator 17 is sending out a output P of "1", but since the record word charge information is "0" the output of the register 50c appears on the outside of the arithmetic operation unit 50b as it is and written again into the register 50c when the clock pulse CP4 is generated at time $t_{56}$ (see FIG. 8l).

Thereafter, although the parity calculator 17 receives a clock pulse CP3 at time $t_{57}$, since the J-K type flip-flop circuit 17a receive the same input "1" as before, its state is changed to produce an output P of "0". Under this state, since the output C of the register 50c is "1" and the output P of the flip-flop circuit 17a is "0" the exclusive-OR gate circuit $13_{b1}$ produces an output "1" and then "1" is stored in the flip-flop circuit 50d by the clock pulse CP5 supplied at a time of $t_{58}$. As a consequence, when the next data word "101" is written into the buffer 11, data "1101" would be supplied to the ROM 51 as its address input. The succeeding operation is the same as that described above.

With this construction it is possible to use the ROM 51 as a portion of the charge calculator.

As can be noted from the comparison of FIGS. 4 and 8, the time during which the necessary ROM address has to be maintained is longer in FIG. 8, it is the configuration by FIG. 8 that can realize the higher data transfer speed and higher speed of writing.

It should be understood that the invention is not limited to the specific embodiments described above and that various kinds of applications, and modifications can be made.

For example, the conversion table shown in FIG. 1 and the conversion formats shown in Table I and II are were illustrative and the number m of the bits of a data word and the number n (n>m) of the bits of a record word can be determined arbitrarily. Furthermore, the number of data words corresponding to 1 to 2 can be selected arbitrarily so long as the construction is possible.

With the construction described above, it is possible to eliminate a DC component of the recording current by converting a data word obtained by partitioning an original information bit sequence at every m bits into n bit record bit (n>m). The magnetic polarity of only a record bit "1" is inverted and then recorded on a magnetic medium and the presence and absence of the magnetic polarity inversion is converted into a detected digit (3 values) with a class 1 partial response system. Each n digits are converted into a data word without using other digits. Accordingly, it is possible to realize higher linear bit density than the prior art apparatus. Furthermore, as the inter-symbol interference is permitted by applying a partial response system at the time of reproduction, it is possible to narrow the spacing between magnetic polarity inversion, thus enabling higher linear bit density. For example, when compared with a prior art DC component free encoding system disclosed in U.S. Pat. No. 4,037,335 it is possible to obtain about 1.5 times of the linear bit density. Further, when reproducing a data word as it is not necessary to use digits other than a detection digit corresponding to that data word, it is possible to prevent propagation of the error produced at the time of reproduction successively to succeeding bits without the necessity of using a precoder for preventing error propagation as disclosed in U.S. Pat. No. 3,648,265. In contrast, according to this invention as zero DC encoding is used, it is not necessary to use such precoder.

What is claimed is:

1. A method of magnetically recording and reproducing a digital informations comprising the steps of:
    preparing a conversion table in which data words each comprising a plurality of (m) bits correspond to respective record words each having n bits (n>m) and in which an integrated value of NRZI recording current becomes zero, or two record words each including n bits and in which the integrated value of NRZI recording current is not zero and polarities of said two record words are opposite;
    partitioning an original information bit sequence into data words at every m bits;
    converting the data words into record words when the former correspond to record words in said conversion table;
    when one of said data words corresponds to two record words in said conversion table, converting one of said record words into a record word such that, in accordance with the integrated value of the NIRZI recording current up to a conversion point, an absolute value of said integrated value would decrease;
    recording a record word sequence obtained by said conversion on a magnetic medium as a magnetic polarity inversion sequence $a_0, a_1, a_2, \ldots a_i$ where $a_i$ represents by 1 or $-1$ a magnetic inversion in which two N poles oppose each other or two S poles oppose each other, and by 0 a magnetic polarity noninversion and i represents a position in said magnetic polarity inversion sequence;
    reading said magnetic polarity inversion sequence out of said magnetic medium converting read out informations into a 3 valued detected digit sequence of class 1 partial response type expressed by $b_0, b_1, b_2, \ldots b_j \ldots$ where $b_j = a_{j-1} + a_j$
    converting said detected digit sequence into m bit data words at every n digits; and reproducing the m bit data words.

2. The apparatus for recording and reproducing digital informations comprising:
    an encoder provided with a conversion table according to which m bit data words are converted into n bits (n>m) record words by said data words acting as address inputs;
    an n bit shift register which in parallel stores, at a first timing, said n bit record words outputted from said encoder;
    an NRZI recording current modulator for producing an NRZI recording current in accordance with serially read out record words from said shift register at a second timing;
    a head connected to receive outputs of said NRZI recording current modulator for recording digital informations on a recording medium;
    means for detecting whether an integrated value of the NRZI current is zero or not; and
    means for generating a control signal which selects a record word to be converted by said encoder according to a data word supplied at the next time according to an output of said detecting means and integrated value of the NRZI recording current up to a conversion point;
    said conversion table of said encoder including a first portion in which respective data words are converted into one record word wherein the integrated value of the NRZI recording current becomes zero, and a second portion in which respective data words are converted into two record words wherein the integrated value of the NRZI recording current is not zero and the record words have different polarities, and
    said control signal generating means sending to said encoder a control signal which selects a record word having a sign which makes small the integrated value of the NRZI recording current up to a conversion point when said detecting means determines that the integrated value of said NRZI recording current does not become zero.

3. The apparatus according to claim 2 wherein said encoder is constituted by a ROM.

4. The apparatus according to claim 2 wherein said detecting means performs a detection operation according to an output of said shift register.

5. The apparatus according to claim 2 wherein said encoder comprises a J-K flip-flop circuit.

6. The apparatus according to claim 2 wherein said control signal generating means comprise an up-down counter, a J-K flip-flop circuit supplied with an output of said shift register, a gate circuit for controlling up and down counts of said up-down counter under control of an output of said J-K flip-flop circuit, an exclusive OR gate circuit supplied with a most significant bit output of said up-down counter, and an output of said detecting means, and means for supplying an output of said exclusive OR gate circuit to said encoder.

7. The apparatus according to claim 6 wherein the output of said exclusive-OR gate circuit designated said conversion table in combination with said data word.

8. The apparatus according to claim 2 which further comprises a buffer which temporarily stores said data word at a third timing before said data word is sent to said encoder.

9. The apparatus according to claim 2 wherein said conversion table stores record words to be converted from data words, a control information necessary to determine whether the integrated value of the NRZI recording current formed according to the record words is zero or not, and a charge information when the integrated value of the NRZI current formed according to the record words is not zero, wherein said detecting means operates in response to the control information necessary to determine whether the integrated value of the NRZI recording current is zero or not, and wherein said control signal generating means operates according to said charge information.

10. The apparatus according to claim 9 wherein said control signal generating means comprises an arithmetic operation unit supplied with an output of said encoder, a register for storing an output of said arithmetic operation unit at a third timing, an exclusive-OR gate circuit supplied with a portion of an output of said register and an output of said detecting means, and a flip-flop circuit for receiving an output of said exclusive-OR gate circuit at a fourth timing, said arithmetic operation unit adding or subtracting said two outputs applied thereto in accordance an output of said register and under control of an output of said detecting means and an output of said flip-flop circuit being sent to said encoder.

11. The apparatus according to claim 1 which further comprises reproducing apparatus including a reproducing head which reproduces digital informations recorded on said recording medium with a NRZI system, means for converting signals reproduced by said reproducing head into 3 valued detected digit sequence of a class 1 partial response type and means for converting said detected digit sequence into m bit data words at every n digits.

12. The apparatus according to claim 11 wherein said converting means comprises amplitude detectors which convert said reproduced signals into said 3 valued detected digit sequence depending upon a judgment as to whether amplitude values of the reproduced signals are larger or smaller than a reference value set around a zero level, an inversion detector for detecting whether the reproduced signals have been inverted or not, and means for sending an output of said amplitude detector to said converting means.

13. The apparatus according to claim 11 wherein said converting means comprises two shift registers which serially receive and store outputs of respective detectors at a third timing and in parallel send out stored outputs, and a decoder supplied with outputs of said two shift registers for forming data words with a conversion table opposite to said first mentioned conversion table.

* * * * *

UNITED STATES PATENT AND TRADEMARK OFFICE
CERTIFICATE OF CORRECTION

PATENT NO. : 4,343,023

DATED : August 3, 1982

INVENTOR(S) : Nishimura, et al.

It is certified that error appears in the above-identified patent and that said Letters Patent is hereby corrected as shown below:

| COLUMN | LINE | DESCRIPTION |
|---|---|---|
| 3 | 62 | Delete "date" and insert in lieu thereof --data--. |
| 4 | 40 | Delete "superimposed" and insert in lieu thereof --superposed--. |
| 5 | 17 | Delete "$b_j = a_{j-1}a_1$" and insert in lieu thereof --$b_j = a_{j-1} + a_1$--. |

Signed and Sealed this

Twenty-sixth Day of November 1985

[SEAL]

Attest:

DONALD J. QUIGG

Attesting Officer

Commissioner of Patents and Trademarks